(12) United States Patent
Kumakura

(10) Patent No.: US 6,645,102 B2
(45) Date of Patent: Nov. 11, 2003

(54) PIVOTALLY MOVABLE PLASTIC GUIDE FOR POWER TRANSMISSION DEVICE

(75) Inventor: Atsushi Kumakura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/022,777

(22) Filed: Dec. 17, 2001

(65) Prior Publication Data

US 2002/0077204 A1 Jun. 20, 2002

(30) Foreign Application Priority Data

Dec. 15, 2000 (JP) ........................................ 2000-382798

(51) Int. Cl.$^7$ ................................................. F16H 7/08
(52) U.S. Cl. ......................................................... 474/111
(58) Field of Search ................................ 474/140, 111, 474/101, 148, 123, 109, 145

(56) References Cited

U.S. PATENT DOCUMENTS

| | | | | |
|---|---|---|---|---|
| 4,826,468 A | * | 5/1989 | Friedrichs | 474/111 |
| 4,832,664 A | * | 5/1989 | Groger et al. | 474/111 |
| 5,318,482 A | | 6/1994 | Sato et al. | |
| 6,322,471 B1 | * | 11/2001 | Hashimoto | 474/140 |

FOREIGN PATENT DOCUMENTS

| | | | |
|---|---|---|---|
| EP | 0867639 | | 9/1998 |
| JP | 7-36201 | | 8/1995 |
| JP | 2519476 | | 9/1996 |
| JP | 08-226506 A | * | 9/1996 |
| JP | 8254253 | | 10/1996 |
| JP | 9-324839 | | 12/1997 |
| JP | 2818795 | | 8/1998 |
| JP | 10-311395 A | * | 11/1998 |
| JP | 11022790 | | 1/1999 |
| JP | 11201246 | | 7/1999 |
| JP | 2000-97300 A | * | 4/2000 |
| JP | 2000220706 | | 8/2000 |
| JP | 2000-337462 A | * | 12/2000 |

* cited by examiner

*Primary Examiner*—Marcus Charles
(74) *Attorney, Agent, or Firm*—Dann, Dorfman, Herrell and Skillman; Henry H. Skillman

(57) ABSTRACT

A guide for a power transmission device includes a one-piece guide body molded of synthetic resin having a longitudinal groove extending in a carrier along the length thereof and opening to a longitudinal edge of the carrier facing away from a shoe surface, and a reinforcement plate fitted in the longitudinal groove of the guide body and having a through-hole at one end thereof, the through-hole being aligned with a mount hole formed in the carrier of the guide body.

14 Claims, 9 Drawing Sheets

PIVOTALLY MOVABLE PLASTIC GUIDE FOR POWER TRANSMISSION DEVICE

BACKGROUND OF THE INVENTION

1. Field of the Invention

The present invention relates to a pivotally movable guide for use in a power transmission device including an endless chain trained around a driving sprocket and a driven sprocket, or a similar power transmission device including an endless belt trained around a driving pulley and a driven pulley. More particularly, it relates to a pivotally movable plastic guide used as a tensioner lever or a guide lever pivotally mounted on a single shaft in the power transmission device.

2. Description of the Related Art

In general, an engine or a driving unit includes a power transmission device for transmitting power by means of a chain or a belt. In the chain or belt power transmission device, a pivotally movable guide having slip function is used. The movable guide is mounted to a body of the engine or driving unit by means of a mounting bolt or a pin.

In use, the movable guide is held in slide contact with an endless chain or belt while running so as to apply an appropriate tension to the chain, or to prevent whipping and lateral oscillation of the chain or belt during travel.

FIGS. 16 to 18 show a conventional movable plastic guide 100 used in a chain drive system, the guide taking the form of a tensioner lever. The guide 100 has a one-piece structure molded of a single synthetic resin material and includes a curved shoe 101 for slide contact with a chain C, a thin plate-like guide body 102 disposed on the back side of the shoe 101 along the length thereof and extending perpendicularly to a front surface (shoe surface) of the shoe 101, a side flange 103 disposed on and along a side edge of the guide body 101 opposite to the shoe 101, and a boss 105 formed at one end of the guide body 102 and having a mount hole 104 for attachment of the guide 100 to the body of an engine or a driving unit. Reference numeral 102' denotes reinforcement ribs formed on front and rear surfaces of the thin plate-like guide body 102.

Due to the one-piece structure molded of a single synthetic resin material, the conventional movable plastic guide 100 is unable to maintain its slip properties, wear resistance, strength properties at high levels in a compatible manner. For instance, when a synthetic resin material with excellent slip properties and wear resistance is used, the resulting movable guide has an insufficient mechanical strength. Alternatively, enlarging the cross section to recover the insufficient mechanical strength results in a guide with undue thickness, which requires a large space for installation of the guide to the body of the engine or driving unit.

To deal with this problem, several improvements have been proposed. According to one improvement disclosed in Japanese Patent No. 2,818,795, a plastic guide is formed by a support member of fiber reinforced plastic and a lining member of high wear-resistant plastic, wherein the support member and the lining member are produced in a progressive molding cycle and are interconnected via one or several dovetailed connections. According to another improvement disclosed in Japanese Patent Laid-open Publication No. 8-254253, a plastic guide is formed by insert molding, wherein an extruded steel core or insert is molded with synthetic resin. Both the progressive molding process and the insert molding process require a complicated molding die assembly, which increases manufacturing cost of the plastic guides. Additionally, due to the difference in thermal expansion coefficient between two different plastic materials or between the plastic material and the steel core, the guide is likely to deform or sometimes break.

Still another prior improvement is shown here in FIGS. 19 to 21, wherein a movable plastic guide 110 is formed by a curved plastic shoe 111, a plastic guide body 111 integrally molded with the shoe 111 and a reinforcement plate 118 of steel or iron fitted in a groove 117 formed in a front surface of the molded shoe 111. The guide body 112 has reinforcement ribs 112' and a side flange 113. The reinforcement plate 118 is arranged in parallel with a curved shoe surface of the molded guide body 111, so that the modulus of section of the movable guide 110 is relatively small and this deteriorates the rigidity and strength of the movable guide 110. Especially, since a mount hole 114 extending through a boss of the molded guide body 111 is distant from, and hence is not reinforced by, the reinforcement plate 118, as shown in FIGS. 19 and 20, the strength of a molded guide body portion extending around the boss is very low. Additionally, the curved reinforcement plate 118 made of metal requires a punching process followed by a bending process, which increases the manufacturing cost of the movable guide 110.

According to another prior improvement, a movable guide is formed by a guide body made of metal or fiber reinforced plastic and a plastic shoe that are formed separately and are interconnected via a mechanical connection such as hooks formed on the shoe (see Japanese Utility Model Publication No. 7-36201, Japanese Utility Model Registration No. 2,519,476 and Japanese Patent Laid-open Publication No. 9-324839). The two-piece guide is complicated in construction, is not readily adapted to an automated assembling process, requires relatively high manufacturing cost, and may cause accidental separation of the guide body and the shoe due to a damage at the mechanical connection.

According to still another prior improvement, a guide has a plastic guide body sandwiched between metal plates (see Japanese Patent Laid-open Publications Nos. 11-2012249, 11-22790 and 2000-220706). The guide of the laminated structure is costly to manufacture due to parts variety and increased assembling man-hours.

SUMMARY OF THE INVENTION

It is, accordingly, an object of the present invention to provide a pivotally movable plastic guide for a power transmission device, which includes a plastic guide body of a simple configuration and a reinforcement plate of a simple configuration arranged to enlarge the modulus of section of the guide to thereby increase the flexural rigidity and strength of the guide without increasing the cross-sectional dimensions and overall weight and size of the guide, which occupies a relatively small space for installation with respect to a fixed support member such as an engine body, and which is free from break or rupture caused due to the difference in thermal expansion coefficient between the guide body and the reinforcement plate.

To achieve the foregoing object, according to the present invention, there is provided a guide for a power transmission device including an endless chain or belt, the lever comprising: an elongated one-piece guide body molded of synthetic resin, the guide body having a shoe at one longitudinal edge thereof and a plate-like carrier integral with the shoe. The shoe has a shoe surface for slide contact with the chain or belt, and the carrier extends from the shoe in a direction perpendicularly away from the shoe surface and has a longitudinal groove extending along the length thereof and opening to a longitudinal edge of the carrier facing away from the shoe surface. The carrier further has a mount hole formed at one end thereof for attachment of the guide to a stationary mount base. The guide further comprises a reinforcement plate fitted in the longitudinal groove of the carrier and having a through-hole at one end thereof, the through-hole being aligned the mount hole of the carrier.

The guide body including a shoe and a carrier integrally molded from synthetic resin into a one-piece structure has slip function. The carrier has a longitudinal groove extending along the length thereof and opening to a longitudinal edge thereof facing away from the shoe surface. With the reinforcement plate fitted in the longitudinal groove of the carrier, the guide has high flexural rigidity and strength. The reinforcement plate can readily be assembled with the guide body merely by being inserted into the longitudinal groove in the carrier. Such simple assembling process lowers the manufacturing cost of the guide and is particularly suitable for automated assembly of the guide.

The guide body and the reinforcement plate are connected together at one end when the guide is mounted to a stationary mount base by means of a shouldered bolt or a pin extending through the mount hole in the carrier and the through-hole in the reinforcement plate. With this arrangement, the opposite end of the reinforcement plate is kept free in the longitudinal direction thereof within the longitudinal groove of the carrier. Accordingly, even when the reinforcement plate undergoes thermal elongation relative to the guide body, such thermal elongation does not cause breaking or rupturing of the guide body.

In one preferred form of the present invention, the longitudinal groove is closed at one end so as to form a pocket in the guide body, and the reinforcement plate having an end portion received in the pocket with a gap formed between the end portion of the reinforcement plate and a corresponding end portion of the guide body. The end portion of the reinforcement plate is located remotely from the through-hole.

The guide body and the reinforcement plate may be interconnected by a snap-fit connection. The carrier may have a locking nose projecting into the longitudinal groove at a position adjacent to the longitudinal edge of the carrier, and the reinforcement plate has a rear edge interlocked with the locking nose. As an alternative, the carrier may have a locking projection projecting into the longitudinal groove, and the reinforcement plate has a recessed portion complementary in contour to the shape of the locking projection and interlocked with the locking projection.

The reinforcement plate may have a plurality of openings formed therein, or a plurality of parallel spaced hollow spaces extending transversely across the width of the reinforcement plate, so as to reduce the overall weight of the guide.

The reinforcement plate may be folded on itself and have a substantially U-shaped cross section having two, parallel spaced wing-like body portions, and the guide body has two laterally spaced longitudinal groove extending along the length of the carrier and opening to a longitudinal edge of the carrier facing away from the shoe surface, the body portions body portions of the folded reinforcement plate being fitted in the longitudinal grooves, respectively. As an alternative, the reinforcement plate may be comprised of two reinforcement plates members of identical configuration, the reinforcement plates members being fitted in the longitudinal groove of the guide body in a superposed condition or in two lateral spaced longitudinal grooves formed in the guide body.

BRIEF DESCRIPTION OF THE DRAWINGS

Preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
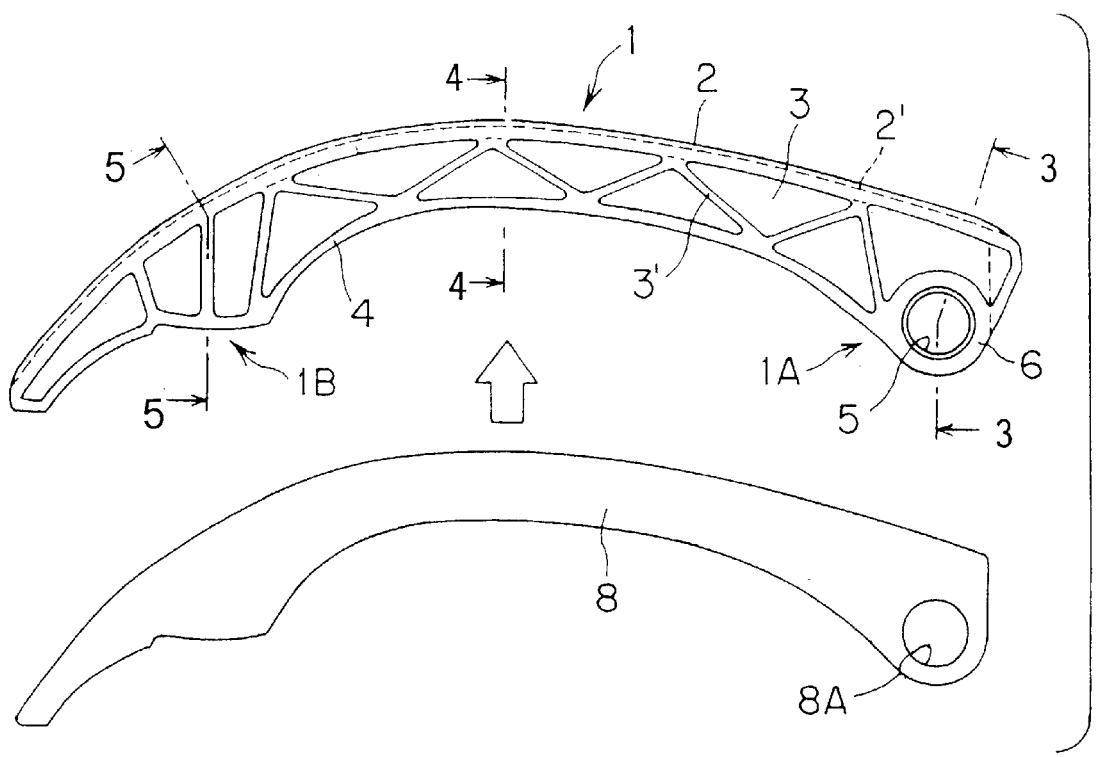
FIG. 1 is an exploded plan view of a guide according to one embodiment of the present invention.
Figure 16:
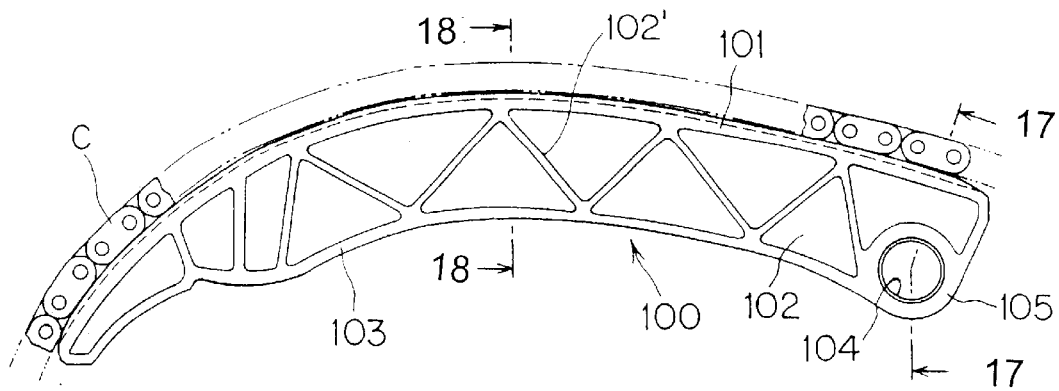
FIG. 16 is a plan view of a conventional guide used with a chain drive system.
Figure 17:
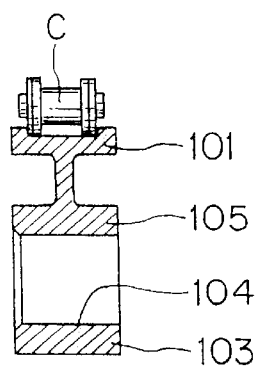
FIG. 17 is a cross-sectional view taken along line 17—17 of FIG. 16.
Figure 18:
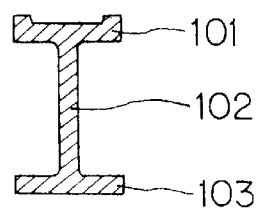
FIG. 18 is a cross-sectional view taken along line 18—18 of FIG. 16.

FIGS. 1 through 5 show a pivotally movable plastic guide according to a first embodiment of the present invention for use in a chain drive system (not shown but similar to one shown in FIG. 16. As shown in FIG. 1, the guide generally comprises a guide body 1 and a reinforcement plate 8 assembled sideway as indicated by the profiled arrow.

The guide body 1 has an elongated one-piece structure molded of synthetic resin. The guide body 1 is composed of a shoe 2 at one longitudinal edge of the guide body 1, and a plate-like support member or carrier 3 integral with the shoe 2 and extending sideway from the shoe in a perpendicular direction to a shoe surface 2' of the shoe 2. The carrier 3 has a flanged side edge 4 facing away from the shoe surface 2' and a boss 6 formed at one end of the carrier 3. The boss 6 has a mount hole 5 for attachment of the guide to a fixed or stationary mount base, such as a body of an engine or a driving unit. The carrier 3 has a plurality of reinforcement ribs 3' formed on front and rear surfaces thereof, and a longitudinal groove 7 extending along the length thereof and opening to the flanged longitudinal edge 4 facing away from the shoe surface 2'.

Figure 2:
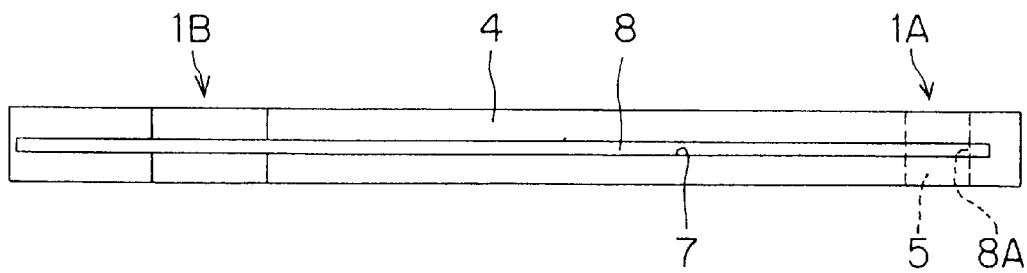
FIG. 2 is a front elevational view of the guide.
Figure 3:
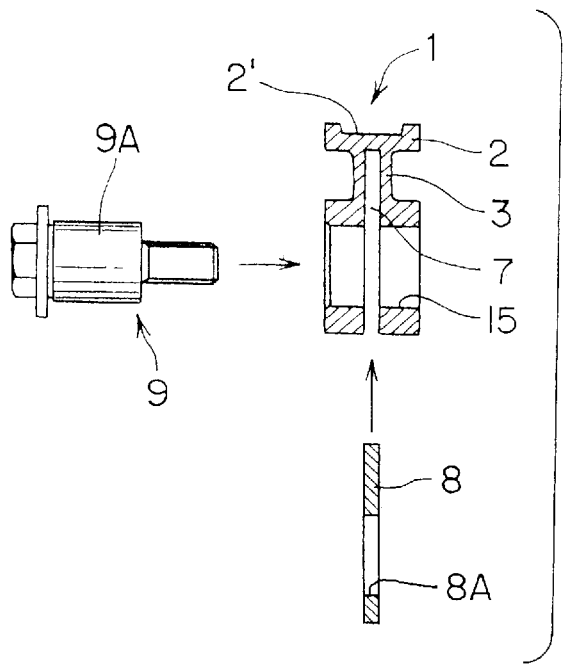
FIG. 3 is a cross-sectional view taken along line 3—3 of FIG. 1, showing the manner in which a guide body and a reinforcement plate are assembled together by a shouldered bolt.
Figure 4:
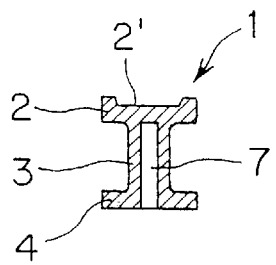
FIG. 4 is a cross-sectional view taken along line 4—4 of FIG. 1.

The groove 7 is formed when the guide body 1 is molded from synthetic resin, and as shown in FIGS. 3 and 4, it extends in a direction from the flanged longitudinal edge 4 of the carrier 3 to the shoe 2 across the width of the carrier 3. In order to strengthen or reinforce the grooved guide body 1, the reinforcement plate 8 is fitted in the longitudinal groove 7 from the side of the carrier 3. The reinforcement plate 8 has a through-hole 8A (FIGS. 1 and 3) formed at one end thereof, the through-hole 8a being aligned with the mount hole 5A of the carrier 3, as shown in FIG. 2.

With the reinforcement plate 8 received in the groove 7 of the carrier 3, the guide body 1 is mounted to a fixed or stationary mount base, such as the body of an engine or a driving unit (not shown) by means of a shouldered bolt 9 (FIG. 3) or a mounting pin (not shown) extending through the mount hole 5 in the carrier 3 and the through-hole 8A in the reinforcement plate 8. The shouldered bolt 9 has a large-diameter portion 9A devoid of screw threads, which portion is fitted in the mount hole 5 and the through-hole 8a and forms a pivot pin about which the guide turns. With this mounting, at one end 1A (FIG. 1) of the guide body 1, the guide body 1 and the reinforcement plate 8 are firmly connected together by the shouldered bolt 9, while at the other end 1B (FIG. 1) of the guide body 1, the groove 7 is partly closed by a plunger 10 of a tensioner device of the chain drive system so that the reinforcement plate 8 is prevented from displacing off the guide body 1.

Though not limited, it is preferable, when considering the necessary function of the shoe surface 2', that the guide body 1 is made of an engineering plastic having excellent wear-resistance and lubricity. The guide body 1 may be made of a fiber-reinforced plastic. The reinforcement plate 8 is preferably made of ferrous metal, non-ferrous metal such as aluminum, magnesium, or titanium, engineering plastic with excellent flexural rigidity and strength, or fiber-reinforced plastic. Even when the guide member 1 and the reinforcement plate 8 have different thermal expansion coefficients, because the reinforcement plate 8 is fitted in the groove 7 with its one end constrained in position relative to the guide body 1 by means of the shouldered bolt 9 extending through the through-hole 8A and the mount hole 5 of the guide body 1, the guide body 1 and the reinforcement plate 8 are freely expandable or contractible in the longitudinal direction of the groove 7 so as to accommodate the difference in thermal expansion coefficient. The guide is thus protected from breaking or rupturing which would otherwise occur due to the difference in thermal expansion coefficient between the guide body 1 and the reinforcement plate 8.

Figure 5:
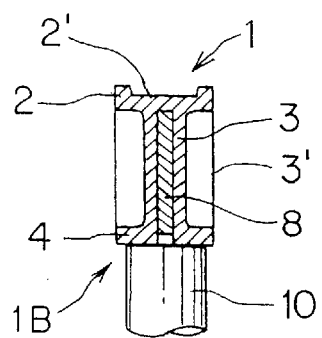
FIG. 5 is a cross-sectional view taken along line 5—5 of FIG. 1 with the reinforcement member shown in an assembled condition.
Figure 6:
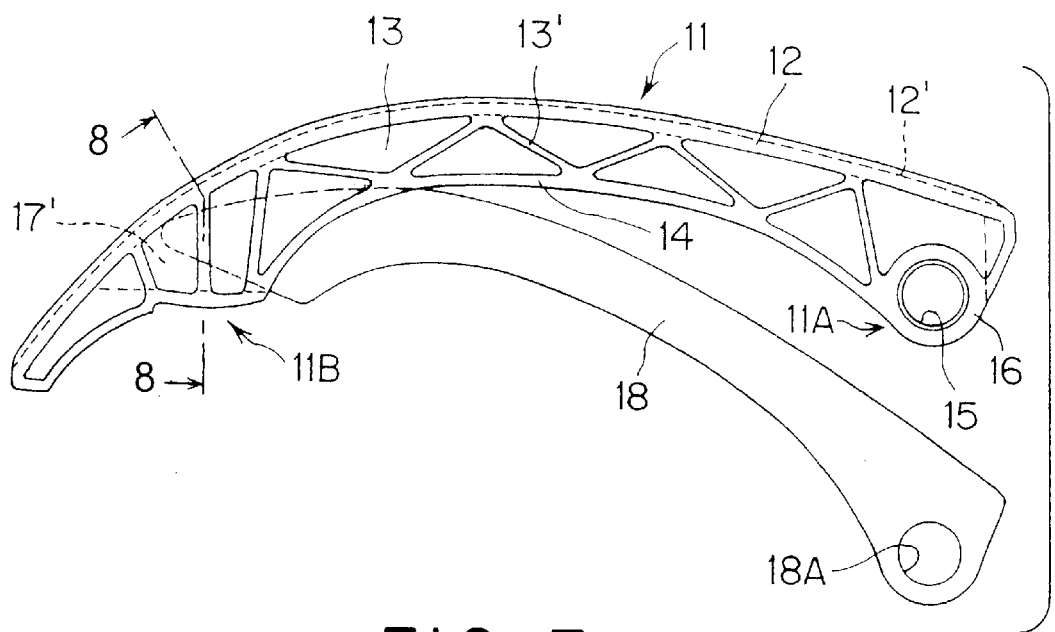
FIG. 6 is a plan view illustrative of the manner in which a guide body and a reinforcement plate are assembled into a guide according to a second embodiment of the present invention.
Figure 7:
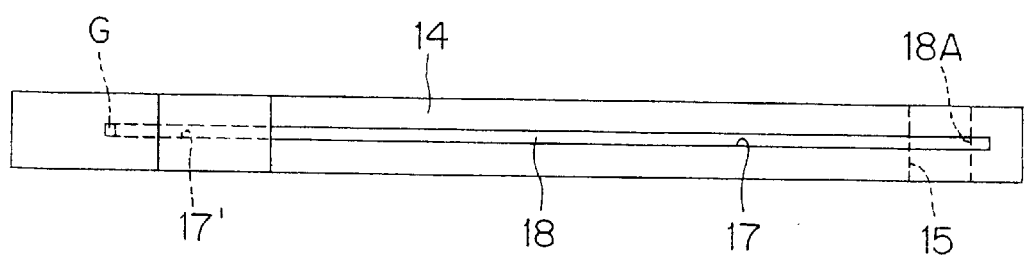
FIG. 7 is a front elevational view of the guide as it is in an assembled state.
Figure 8:
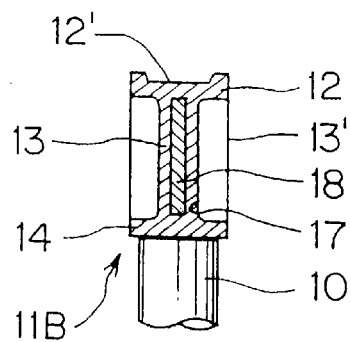
FIG. 8 is a cross-sectional view taken along line 8—8 of FIG. 6 with the reinforcement plate shown in an assembled condition.

FIGS. 6 through 8 show a guide according to a second embodiment of the present invention. The guide in this embodiment differs from the guide in the first embodiment shown in FIGS. 1–5 only in that the guide body 11 has a pocket 17' at an end 11B opposite to a mount hole 15. As in the case of the first embodiment, the guide of this embodiment comprises a guide body 11 and a reinforcement plate 18 assembled sideway as indicated by the profiled arrow.

The guide body 11 has an elongated one-piece structure molded of synthetic resin. The guide body 11 is composed of a shoe 12 at one longitudinal edge of the guide body 11, and a plate-like support member or carrier 13 integral with the shoe 12 and extending sideway from the shoe 12 in a perpendicular direction to a shoe surface 12' of the shoe 12. The carrier 13 has a flanged side edge 14 facing away from the shoe surface 12' and a boss 16 (FIG. 6) formed at one end of the carrier 13. The boss 16 has a mount hole 15 for attachment of the guide to a fixed or stationary mount base, such as a body of an engine or a driving unit. The carrier 13 has a plurality of reinforcement ribs 13' formed on front and rear surfaces thereof, and a longitudinal groove 17 extending along the length thereof and opening to the flanged longitudinal edge 14 facing away from the shoe surface 12'. The longitudinal groove 17 is closed at one end so as to form a pocket 17' in an end portion 11B of the guide body 11 located remotely from the mount hole 15.

In order to strengthen or reinforce the grooved guide body 11, the reinforcement plate 18 having a through-hole 1 8A at one end thereof is fitted in the longitudinal groove 17 from the side of the carrier 13. In this instance, since the groove 17 is closed at one end so as to form the pocket 17', the opposite end portion of the reinforcement plate 8 is inserted in the pocket 17', as shown in FIG. 6, and the remaining portion of the reinforcement plate 18 is forced into the groove 17 in the carrier 13 until the reinforcement plate 18 is fully received in the groove 17. In the assembled state, there is a clearance or gap G (FIG. 7) defined between the opposite end of the reinforcement plate 18 and peripheral walls of the longitudinal groove 17 of the guide body 11.

With the reinforcement plate 18 received in the groove 17 of the carrier 13, the guide body 11 is mounted to a fixed or stationary mount base, such as the body of an engine or a driving unit (not shown) by means of a shouldered bolt (not shown but identical to the one 9 shown in FIG. 3) or a mounting pin (not shown) extending through the mount hole 15 in the carrier 13 and the through-hole 18A in the reinforcement plate 18. In this mounted state, at one end 11A (FIG. 6) of the guide body 11, the guide body 11 and the reinforcement plate 18 are firmly connected together by the shouldered bolt (or the mounting pin), while at the other end 11B (FIG. 6) of the guide body 11, the reinforcement plate 18 is held inside the pocket 17' of the guide body 11. The pocketed end portion 11B of the molded guide body 11 has a certain degree of resiliency and hence provides a cushioning effect with respect to the plunger 10 of a tensioner device. This contributes to the reduction of operation noise.

With the arrangement described above, since the reinforcement plate 18 is fitted in the groove 17 with its one end constrained in position relative to the guide body 11 by means of the non-illustrated shouldered bolt extending through the through-hole 18A and the mount hole 15 of the guide body 11, and since the gap G is provided between the end of the reinforcement plate 18 opposite to the through-hole 18A and the guide plate 11, the guide body 11 and the reinforcement plate 18 are freely expandable or contractible in the longitudinal direction of the groove 17. Accordingly, even when the reinforcement plate 18 undergoes thermal elongation relative to the guide body 11 due to the difference in thermal expansion coefficient, such thermal elongation is accommodated or taken up by the gap G. Thus, breaking or rupturing of the guide body 11 does not take place.

The pivotally movable plastic guides according to the first and second embodiments described above have a guide body including a shoe and a carrier integrally molded of a synthetic resin into a one-piece structure. The molded one-piece plastic guide body has slip function and makes it unnecessary to provide a separate shoe member. This reduces the parts variety, assembling man-hours and production cost of the guide.

Since the groove extends along the length of the carrier and open to a longitudinal edge of the carrier facing away from the shoe surface, the reinforcement plate can be readily assembled with the guide body merely by forcing it into the groove. Additionally, the reinforcement plate is allowed to take a simple configuration. This enables the guide to be assembled through an automated assembly process.

Figure 19:
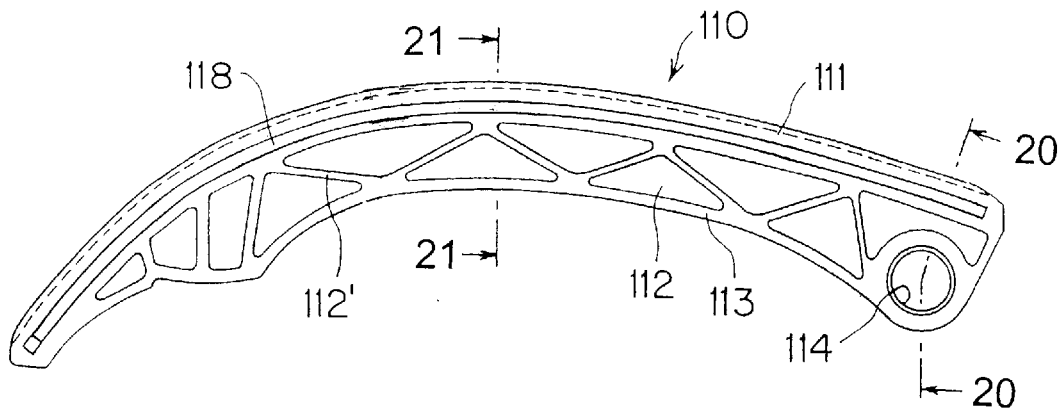
FIG. 19 is a plan view of another conventional guide.
Figure 20:
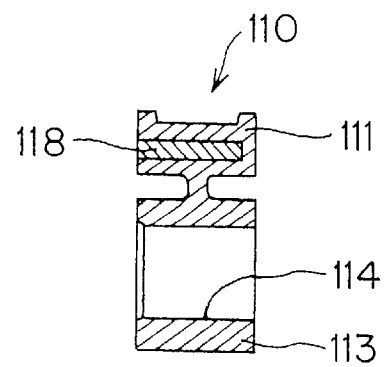
FIG. 20 is a cross-sectional view taken along line 20—20 of FIG. 19.
Figure 21:
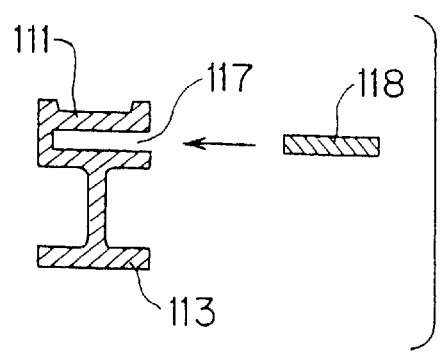
FIG. 21 is a cross-sectional view taken along line 21—21 of FIG. 19, showing the manner in which a reinforcement plate is assembled with a guide body.

With the reinforcement plate fitted in the longitudinal groove in the guide body, the guide has a reinforcement substantially coextensive to the carrier in a plane perpendicular to the shoe surface. The guide thus reinforced has high flexural rigidity and strength which are comparable to that of a conventional guide made of metal. The reinforcement plate disposed coextensively with the carrier increases the modulus of section of the guide much greater than the conventional arrangement shown in FIG. 19. This means that the coextensive arrangement of the reinforcement plate and the carrier can provide strength properties comparable to those of the conventional arrangement even when the thickness of the guide is smaller then the conventional guide. The thin guide requires less space for installation than the conventional guide.

Figures 9, 9A:
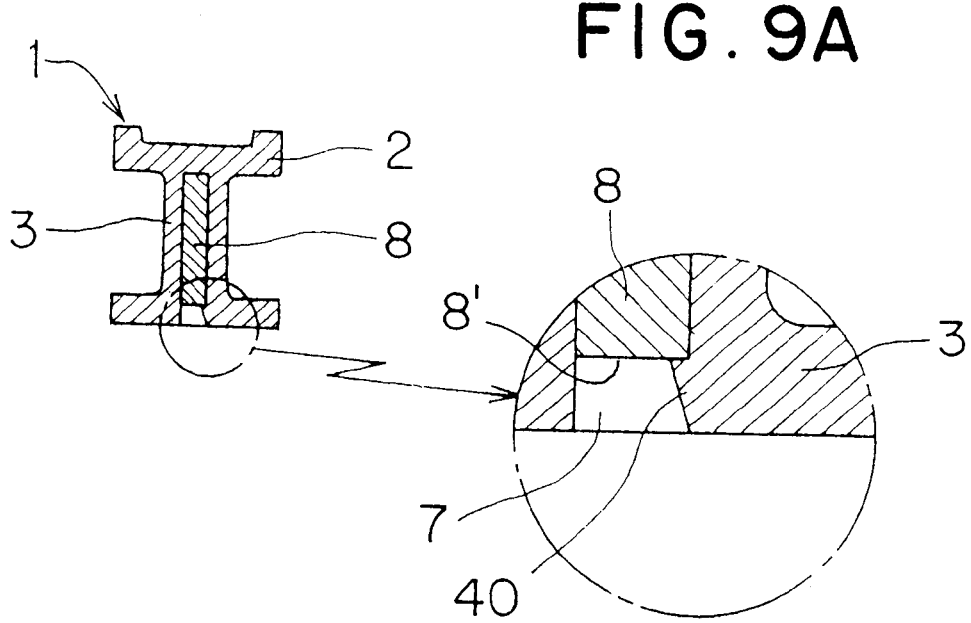
FIG. 9 is a cross-sectional view showing a connection between the guide body and the reinforcement plate.
FIG. 9A is an enlarged view a portion of FIG. 9.
Figures 10, 10A:
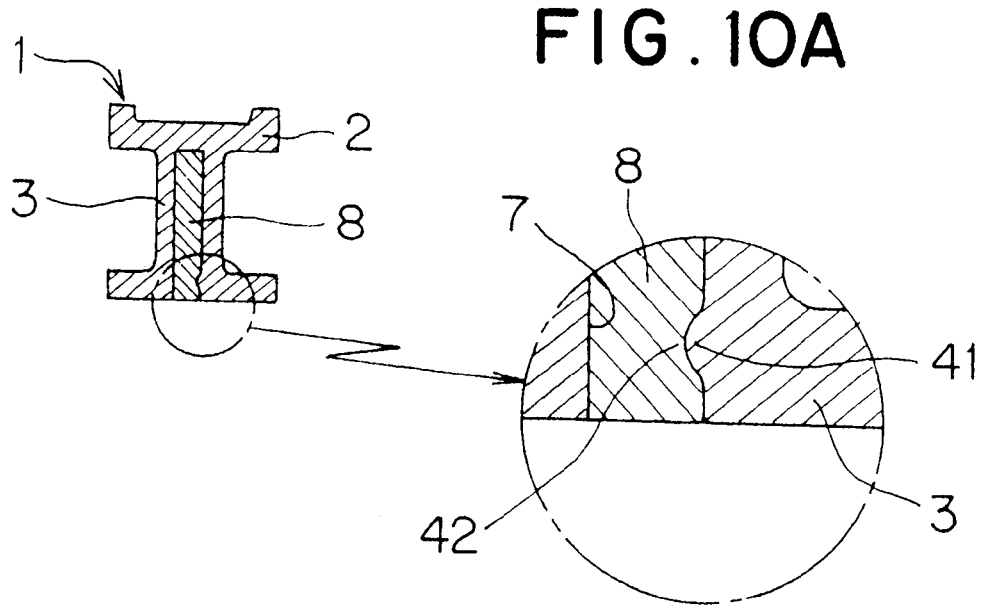
FIG. 10 is a cross-sectional view showing a connection between the guide body and the reinforcement plate according to a modification of the present invention.
FIG. 10A is an enlarged view a portion of FIG. 10.

FIGS. 9 and 10 show modifications accordingly the present invention, which are particularly effective to keep the guide body 11 and the reinforcement plate 8 in an assembled state before the guide is mounted to the stationary mount base. In a first modification shown in FIGS. 9 and 9A, the carrier 3 has a locking nose 40 disposed adjacent to an open side of the groove 7 (FIG. 9A) and projecting into the groove 7. When the reinforcement plate 8 is fully inserted in the groove 7, the locking nose 40 and a rear edge 8' of the reinforcement plate 8 interlock with each other. In the second modification shown in FIGS. 10 and 10A, the carrier 3 has a semi-spherical locking projection 41 disposed adjacent to an open side of the groove 7 and projecting into the groove 7, while the reinforcement plate 8 has a semi-spherical recessed portion 42 engaged with the semi-spherical locking projection 41. In each of the modifications described above, the guide body 11 and the reinforcement plate 8 is interconnected by a snap-fit connection. The locking projection 41 may be provided on the reinforcement plate 8, in which instance the recessed portion 42 is formed in the carrier 3.

Figure 11:
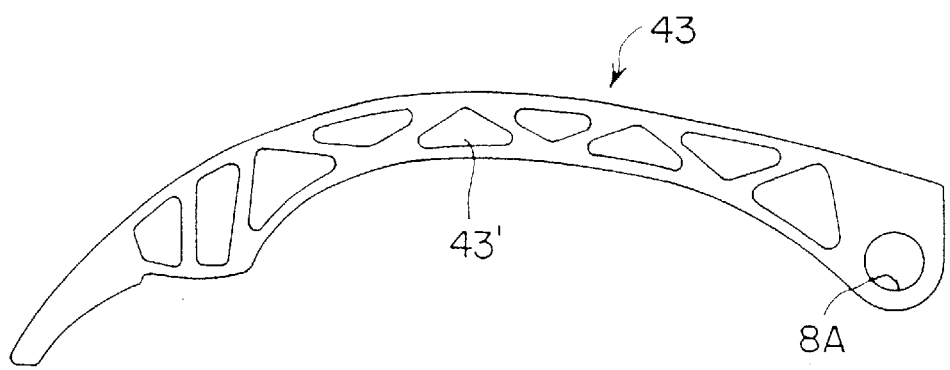
FIG. 11 is a plan view showing a modified form of the reinforcement plate.

FIGS. 11 and 11 show modified forms of the reinforcement plate 8 according to the present invention. The modified reinforcement plate 43 has a plurality of openings or apertures 43' for reducing the overall weight of the guide. The shape and arrangement of the apertures 43' are determined such that the reinforcement plate 43 can maintain the necessary strength properties of the guide. Another modified reinforcement plate 45 shown in FIG. 12 has a number of parallel spaced hollow spaces 44 extending transversely across the width of the reinforcement plate 45. The reinforcement plate 45 may be molded from synthetic resin or cased with aluminum alloy. It is possible according to the present invention to change the thickness of the reinforcement plate at specific portions which are subjected to heavier loads than others from the chain or the plunger 10 (FIGS. 5 and 8).

Figure 13:
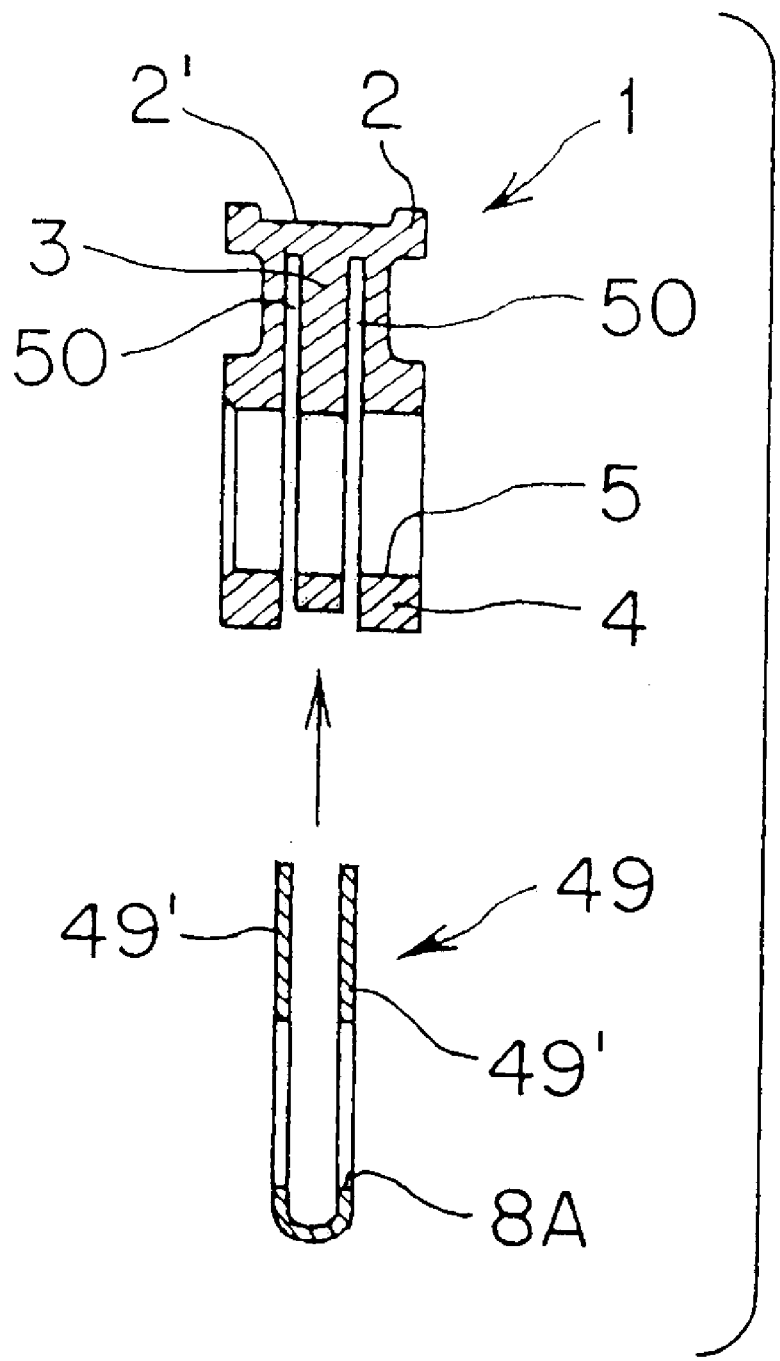
FIG. 13 is a cross-sectional view corresponding to FIG. 3, but illustrative of the manner in which a guide body and a reinforcement plate according to a modification of the present invention are assembled together.
Figure 14:
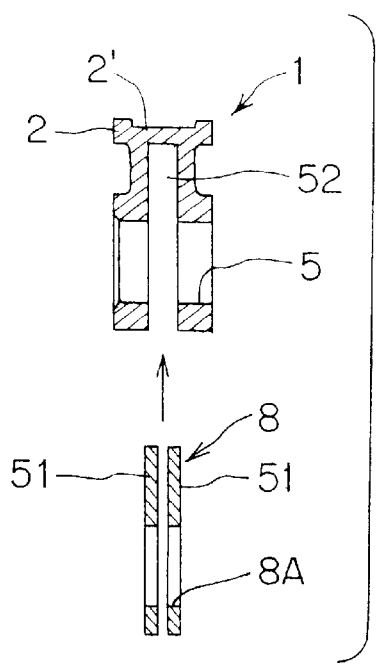
FIG. 14 is a cross-sectional view illustrative of the manner in which a guide body and a reinforcement plate according to another modification of the present invention are assembled together.
Figure 15:
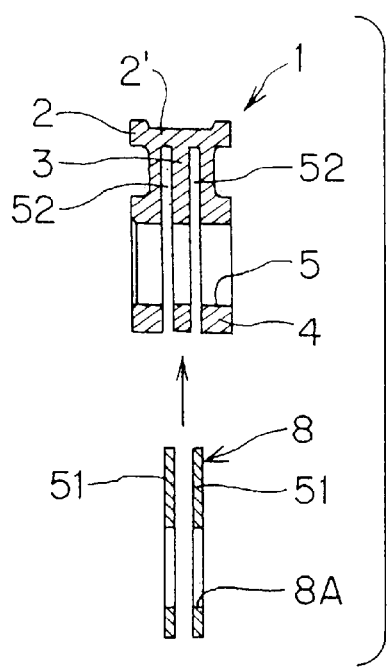
FIG. 15 is a cross-sectional view illustrative of the manner in which a guide body and a reinforcement plate according to still another modification of the present invention are assembled together.

FIGS. 13 through 15 show various modifications concerning the shape and number of the reinforcement plate according to the present invention. In a first modification shown in FIG. 13, a reinforcement plate 49 is bent or folded on itself and has a U-shaped cross section. In this instance, the guide body 1, for use in combination with the folded reinforcement plate 49, has two, laterally spaced longitudinal grooves 50, 50 in which two, parallel spaced wing-like body portions 49', 49' of the folded reinforcement plate 49 are fitted, respectively. The reinforcement plate 49 has a through-hole 8A extending through the body portions 49', 49'. In a second modification shown in FIG. 14, the reinforcement plate is comprised of two reinforcement plate members 51, 51 of identical configuration. The reinforcement plate members 51, 51 are fitted in a single longitudinal groove 52 of the guide body 1 in a superposed condition. A third modification shown in FIG. 15 is a variant of the modification shown in FIG. 14, wherein two reinforcement plate members 51, 51 are fitted separately in two laterally spaced longitudinal grooves 51, 51.

Obviously, various minor changes and modifications of the present invention are possible in the light of the above teaching. It is therefore to be understood that within the scope of the appended claims, the present invention may be practiced otherwise than as specifically described.

What is claimed is:

1. A guide for a power transmission device including an endless chain or belt, the lever comprising:

an elongated one-piece guide body molded of synthetic resin, the guide body having a shoe at one longitudinal edge thereof and a carrier integral with the shoe, the shoe having a shoe surface for slide contact with the chain or belt, the carrier extending from the shoe in a direction perpendicularly away from the shoe surface and having a longitudinal groove extending along the length thereof and opening to a longitudinal edge of the carrier facing away from the shoe surface, the carrier further having a mount hole formed at one end thereof for attachment of the guide to a stationary mount base; and a reinforcement plate fitted in the longitudinal groove of the carrier and having a through-hole at one end thereof, the through-hole being aligned with the mount hole of the carrier to receive a mounting device constraining said one end to maintain its longitudinal position relative to the mount hole.

2. The guide according to claim 1, wherein the longitudinal groove is closed at one end so as to form a pocket in the guide body, and the reinforcement plate having an end portion received in the pocket with a gap formed between the end portion of the reinforcement plate and a corresponding end portion of the guide body.

3. The guide according to claim 2, wherein the end portion of the reinforcement plate is located remotely from the through-hole.

4. The guide according to claim 1, wherein the guide body and the reinforcement plate are interconnected by a snap-fit connection.

5. The guide according to claim 4, wherein the carrier has a locking nose projecting into the longitudinal groove at a position adjacent to the longitudinal edge of the carrier, and the reinforcement plate has a rear edge interlocked with the locking nose.

6. The guide according to claim 4, wherein the carrier has a locking projection projecting into the longitudinal groove, and the reinforcement plate has a recessed portion complementary in contour to the shape of the locking projection and interlocked with the locking projection.

7. The guide according to claim 1, wherein the reinforcement plate has a plurality of openings formed therein so as to reduce the weight of the reinforcement plate.

8. The guide according to claim 1, wherein the reinforcement plate has a plurality of parallel spaced hollow spaces extending transversely across the width of the reinforcement plate.

9. The guide according to claim 1, wherein the reinforcement plate is folded on itself and has a substantially U-shaped cross section having two, parallel spaced wing-like body portions, and the guide body has two laterally spaced longitudinal groove extending along the length of the carrier and opening to a longitudinal edge of the carrier facing away from the shoe surface, the body portions of the folded reinforcement plate being fitted in the longitudinal grooves, respectively.

10. The guide according to claim 1, wherein the reinforcement plate is comprised of two reinforcement plates members of identical configuration, the reinforcement plates members being fitted in the longitudinal groove of the guide body in a superposed condition.

11. The guide according to claim 1, wherein the reinforcement plate is comprised of two reinforcement plates members of identical configuration, and the guide body has two laterally spaced longitudinal groove extending along the length of the carrier and opening to a longitudinal edge of the carrier facing away from the shoe surface, the reinforcement plate members being separately fitted in the longitudinal grooves.

12. The guide according to claim 1 wherein said plate is fitted in said longitudinal groove for longitudinal expansion or contraction relative to said carrier shoe, allowing for a difference in thermal expansion between the shoe and the plate.

13. The guide according to claim 12 wherein the opposite end of said plate is fitted in the guide body with a gap beyond said opposite end.

14. The guide according to claim 12 in combination with a power transmission device having a mounting bolt or pin, said through hole of the plate and said mount hole of the carrier being constrained by the mounting bolt or pin and to pivotally mount said guide on the power transmission device.

* * * * *

UNITED STATES PATENT AND TRADEMARK OFFICE
CERTIFICATE OF CORRECTION

PATENT NO. : 6,645,102 B2
DATED : November 11, 2003
INVENTOR(S) : Kumakura

Figure 12:
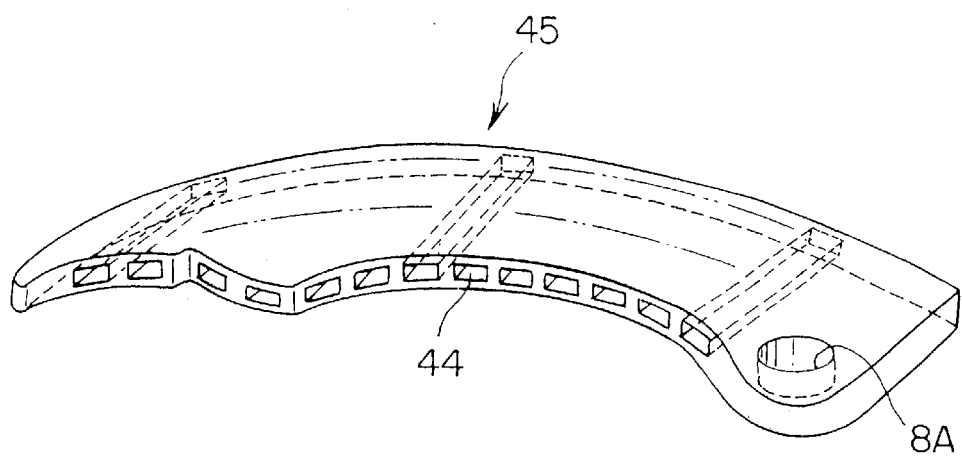
FIG. 12 is a plan view showing another modified form of the reinforcement plate.

It is certified that error appears in the above-identified patent and that said Letters Patent is hereby corrected as shown below:

<u>Column 3,</u>
Line 8, after "aligned" insert -- with --;

<u>Column 7,</u>
Line 60, "FIGS. 11 and 11" should be -- FIGS. 11 and 12 --.

Signed and Sealed this

Second Day of March, 2004

JON W. DUDAS
*Acting Director of the United States Patent and Trademark Office*